United States Patent
Ahlers et al.

(10) Patent No.: US 12,480,604 B2
(45) Date of Patent: Nov. 25, 2025

(54) FIRE PROTECTION ELEMENT HAVING BIMETAL

(71) Applicant: Hilti Aktiengesellschaft, Schaan (LI)

(72) Inventors: Andreas Ahlers, Westendorf (DE); Sebastian Simon, Buchloe Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 976 days.

(21) Appl. No.: 17/296,573

(22) PCT Filed: Nov. 22, 2019

(86) PCT No.: PCT/EP2019/082281
§ 371 (c)(1),
(2) Date: Jun. 24, 2022

(87) PCT Pub. No.: WO2020/120107
PCT Pub. Date: Jun. 18, 2020

(65) Prior Publication Data
US 2022/0325826 A1    Oct. 13, 2022

(30) Foreign Application Priority Data
Dec. 10, 2018    (EP) .................................... 18211212

(51) Int. Cl.
*F16L 5/04* (2006.01)
*E04B 1/94* (2006.01)

(52) U.S. Cl.
CPC .................. *F16L 5/04* (2013.01); *E04B 1/948* (2013.01)

(58) Field of Classification Search
CPC .... F16L 5/02; F16L 5/04; F16L 5/025; H02G 3/0412; E04B 1/947; E04B 2/7411; A62C 2/065
See application file for complete search history.

(56) References Cited

U.S. PATENT DOCUMENTS 3,889,314 A * 6/1975 McCabe ................. A62C 2/245
16/48.5
4,951,442 A * 8/1990 Harbeke, Jr. .......... A62C 2/065
29/447

(Continued)

FOREIGN PATENT DOCUMENTS

DE  295 11 265 U1    11/1995
DE  19964021 A1 *    7/2001 ............. A62C 2/065

(Continued)

OTHER PUBLICATIONS

International Search Report issued Dec. 17, 2019 in PCT/EP2019/082281 with English translation, 7 pages.

(Continued)

*Primary Examiner* — Kyle J. Walraed-Sullivan
(74) *Attorney, Agent, or Firm* — Grüneberg and Myers PLLC

(57) ABSTRACT

A fire protection element can be used for sealing a combustible body, which penetrates an opening in a wall or ceiling, in the event of a fire. The fire protection element has a belt-shaped carrier from the edge of which tongues protrude transversely to the longitudinal direction of said carrier. The tongues are connected to the belt-shaped carrier, at least a significant proportion of the tongues are formed of a bimetal, and the tongues can move in one direction under the effect of heat. A fire protection material is applied to at least one side of the tongues. Furthermore, a method can be used for sealing a combustible body, which penetrates an opening in a wall or ceiling, in the event of a fire.

20 Claims, 2 Drawing Sheets

(56) References Cited

U.S. PATENT DOCUMENTS

| | | | | |
|---|---|---|---|---|
| 5,058,341 | A * | 10/1991 | Harbeke, Jr. | A62C 2/065 52/317 |
| 5,498,466 | A * | 3/1996 | Navarro | C09K 21/14 428/305.5 |
| 5,876,042 | A * | 3/1999 | Graf | F16L 5/04 277/936 |
| 6,029,412 | A * | 2/2000 | Gohlke | F16L 5/04 137/75 |
| 6,725,615 | B1 * | 4/2004 | Porter | A62C 2/065 52/99 |
| 6,928,777 | B2 * | 8/2005 | Cordts | H02G 3/0412 52/220.8 |
| 2011/0180278 | A1 * | 7/2011 | Magnay | F16L 5/04 169/48 |
| 2011/0210222 | A1 * | 9/2011 | Van Walraven | F16L 5/04 248/315 |
| 2014/0007373 | A1 * | 1/2014 | Muenzenberger | H02G 3/0412 16/2.2 |
| 2014/0077043 | A1 * | 3/2014 | Foerg | H02G 3/0412 248/74.1 |
| 2015/0079350 | A1 * | 3/2015 | Tanaka | B32B 37/14 428/167 |
| 2015/0251028 | A1 * | 9/2015 | Klein | H02G 3/0412 277/616 |
| 2016/0076673 | A1 * | 3/2016 | Rule | F16L 5/10 428/377 |
| 2016/0339278 | A1 * | 11/2016 | King, Jr. | F24F 13/08 |
| 2017/0335996 | A1 * | 11/2017 | Lin | F16L 5/10 |
| 2023/0137709 | A1 * | 5/2023 | Förg | F16L 59/029 138/178 |
| 2023/0194024 | A1 * | 6/2023 | Nijdam | A62C 2/065 169/48 |

FOREIGN PATENT DOCUMENTS

| | | | |
|---|---|---|---|
| DE | 10 2004 014347 | 10/2005 | |
| EP | 0 890 372 | 1/1999 | |
| JP | S63-197470 | 8/1988 | |
| WO | WO-2018178298 A1 * | 10/2018 | A62C 2/065 |

OTHER PUBLICATIONS

Written Opinion issued Dec. 17, 2019 in PCT/EP2019/082281 with English translation, 10 pages.

* cited by examiner

FIRE PROTECTION ELEMENT HAVING BIMETAL

CROSS-REFERENCE TO RELATED APPLICATIONS

This application is the National Stage entry under § 371 of International Application No. PCT/EP2019/082281, filed on Nov. 22, 2019, and which claims the benefit of priority to European Application No. 18211212.8, filed on Dec. 10, 2018. The content of each of these applications is hereby incorporated by reference in its entirety.

BACKGROUND OF THE INVENTION

Field of the Invention

The invention relates to a fire protection element and to a method for sealing a combustible body, which penetrates an opening in a wall or ceiling, in the event of a fire, said method using the fire protection element.

Description of Related Art

In order to prevent the spread of fire or smoke in buildings, apertures in ceilings or walls, in which, for example, pipes or cables are routed, must be able to be closed in the event of a fire. For this purpose, components comprising an intumescent material can be used. In the event of a fire, the intumescent material foams up due to the rising temperature and closes the opening, as a result of which the spread of smoke or fire through said opening is prevented, or at least delayed.

Intumescent material is often used in the form of fire protection inserts, which are installed as bandages or wraps into the wall or in the form of collars in front of the wall. The fire protection insert is routinely fastened to a housing or a fabric which is, for example; made of plastics material, fiberglass or metal.

The problem is that the routinely used intumescent materials, for example expandable graphite, have a comparatively high activation temperature of above 150° C. Particularly in the case of pipes having a low melting point, for example pipes made of polypropylene, this can lead to the pipe which is to be closed being melted away before the intumescent material can close the pipe opening.

To overcome this problem, fire protection devices are known, by means of which a pipe is additionally mechanically closed. AU 2018 217 245 A1 discloses, for example, a system in which a plurality of springs held by a plate having a low melting point are provided which, in addition to an intumescent material, mechanically compress the pipe in the event of a fire.

In DE 10 2004 014 347 B4, lamellar locking elements made of bimetal are used, which are coiled around the pipe and uncoil in the event of a fire in order to thereby close the opening in an iris-like manner.

All of these solutions have in common that they are expensive to produce and ensure closure only at elevated temperatures. At the same time, the known fire protection solutions require a lot of space when using additional mechanical elements, such as springs, as a result of which installation is difficult.

SUMMARY OF THE INVENTION

A problem addressed by the invention is therefore that of providing a cost-effective and simply constructed fire protection element which can close an opening early in the event of a fire.

The problem is solved according to the invention by means of a fire protection element for sealing a combustible body, which penetrates an opening in a wall or ceiling, in the event of a fire, the fire protection element having a belt-shaped carrier, from the edge of which tongues protrude transversely to the longitudinal direction of said carrier, which tongues are connected to the wrap-type carrier, at least a significant proportion of the tongues being formed of a bimetal, which tongues can move in one direction under the effect of heat, and a fire protection material being applied to at least one side of the tongues.

DETAILED DESCRIPTION OF THE INVENTION

Figure 1:
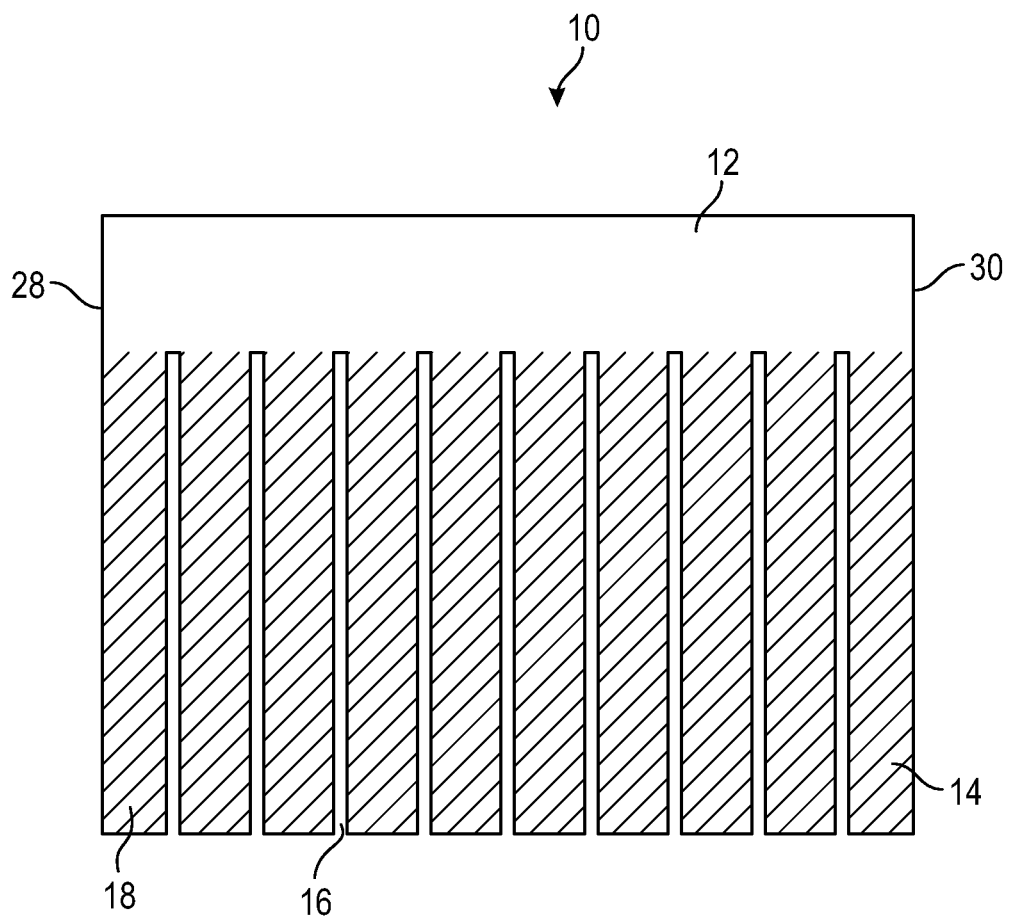
FIG. 1 shows a plan view of a fire protection element according to the invention.

The use of a bimetal has the advantage that the tongues of the fire protection element can already move at temperatures that are only slightly elevated and thus begin to close the opening early as soon as the combustible body begins to soften. The temperature at which and the amount of force with which this movement is carried out can be adjusted by selecting a specific bimetal. It is essential to the invention that a significant proportion of the tongues is formed of a bimetal, the expression "a significant proportion of the tongues" meaning that at least 50% of the tongues, more preferably at least 75%, even more preferably at least 90%, of the tongues are formed of a bimetal. It is particularly preferred that all of the tongues of the fire protection element are formed of bimetal.

Since the bimetal itself actively moves toward the center of the softening combustible body, the opening is mechanically closed by the tongues. If at least the tongues of the fire protection element are additionally provided with a fire protection material, said material can be actively moved into the center of the opening by means of movement of the bimetal and can thus be transported closer to the opening which is exposed by the combustible body and which is intended to be closed. If the fire has already passed from the other side of the wall through the opening, the fire protection material is thereby moved toward the heat source and is thus exposed to an elevated temperature, meaning that it is activated earlier. The tongues, as a carrier of the fire protection material, thus actively facilitate closure of the opening in the event of a fire. In addition, the bimetal prevents passage of heat radiation or at least reduces the passage of said heat radiation.

The fire protection material can be applied to both sides of the tongues and to the belt-shaped carrier, preferably only to both sides of the tongues, and particularly preferably only to the side of the tongues which has a lower coefficient of expansion. In this way, depending on the combustible body used, for example a pipe, a sufficient amount of fire protection material can be applied while saving as much material as possible. In particular, the fire protection material that is applied to the side of the tongues which has a lower coefficient of expansion is effectively moved into the center of the opening by the movement of the tongues and is additionally covered by the tongues.

By designing the belt-shaped carrier and the tongues in one piece, a particularly simple and compact design can be achieved. In this way, for example, a bimetallic strip of sufficient length can be cut at regular intervals to obtain a fire protection element in which the carrier and the tongues are made in one piece from the bimetal.

In a preferred embodiment, the tongues can be separated from one another by slits. This ensures that the fire protection element can be mounted, for example around a pipe, as a collar without the tongues necessarily having to overlap.

In order to guarantee sufficient closure of the opening, the tongues can be arranged so as to not be spaced apart. This ensures that a tongue rests on each point of the pipe.

An embodiment of the tongues in the shape of rectangles allows a particularly simple and cost-effective means of production of the fire protection element.

Early closure of the opening can be achieved when the tongues begin to move, starting from a temperature of 100° C., preferably from a temperature of 60° C. and particularly preferably from a temperature of 40° C., in order to exert a force on the combustible body.

The tongues preferably already reach an end position at a temperature of at most 250° C., particularly preferably at a temperature of at most 200° C. and even more preferably at a temperature of at most 150° C. This ensures that the fire protection material is already in the center of the opening before the fire protection material is activated.

In a preferred embodiment, the tongues, proceeding from the starting position thereof, achieve a bend of more than 20°, preferably more than 90°, but less than 135°. In this way, in the event of fire, the tongues themselves mechanically close the opening which is exposed by the decomposition of the combustible body. At the same time, however, the tongues do not bend so far that they would uncover the opening again.

The fire protection material, which is applied at least to the tongues, can be selected from the group consisting of intumescent material, in particular expandable graphite, fire protection coatings, fire protection foam, in particular polyurethane-based foam, and ablative coatings, in particular aluminum trihydrate, and combinations thereof. As an alternative or in addition to expandable graphite, the intumescent material can contain a melamine-based foaming agent, an acid former, for example ammonium polyphosphate, and an ash former, for example one or more polyalcohols. In this way, an appropriate fire protection material can be selected depending on the type of combustible body.

Using expandable graphite as a fire protection material results in an arrangement in which the expanded expandable graphite closes the opening and is additionally stabilized mechanically by the tongues. In principle, this also makes it possible to use less fire protection material, since sufficiently effective closure properties of the fire protection element can still be achieved.

Different fire protection materials can also be applied to one or both sides of the tongues and/or to the belt-shaped carrier, selected from the group consisting of intumescent material, in particular expandable graphite, fire protection coatings, fire protection foam, in particular polyurethane-based foam, and ablative coatings, in particular aluminum trihydrate, and combinations thereof. This allows the fire protection element to be tailored to a specific requirement.

The belt-shaped carrier and/or the tongues can be provided with an additional coating, preferably an adhesive coating and/or a color coating. An adhesive coating, for example, improves the adhesion of the applied fire protection material to the fire protection element. It is particularly advantageous if at least one side of the fire protection element is provided with a color coating. As a result, for example, the side which has a lower coefficient of expansion can be marked in color, which side is intended to form the side facing the center of the opening, in order to ensure correct installation.

In order to further improve the fire protection properties, the fire protection element can comprise an additional fire protection wrap which is arranged on the carrier and/or the tongues, the fire protection wrap comprising a fire protection material selected from the group consisting of intumescent material, in particular expandable graphite, fire protection coatings, fire protection foam, in particular polyurethane foam, and ablative coatings, in particular aluminum trihydrate, and combinations thereof. In this way, additional fire protection layers can be provided which additionally ensure the closing of the opening in the event of a fire.

The invention also relates to a method for sealing a combustible body, which penetrates an opening in a wall or ceiling, in the event of fire, a fire protection element according to the invention initially being provided. Subsequently, the fire protection element is introduced into the opening in the wall or ceiling, the tongues at least partially protruding from the opening and enclosing the combustible body. In this way, the tongues are exposed to rapid heating in the event of a fire and begin to move toward the opening to be closed, even before the combustible body has completely disintegrated. In addition, early activation of the fire protection material which is mounted on the tongues can be achieved.

According to a first embodiment of the method, the fire protection element can be slid into a gap formed between the wall or ceiling and the combustible body which is already introduced into the opening and said element can be fixed in position by means of adhesion. Alternatively, the fire protection element can be inserted into the opening and secured therein before the combustible body is introduced into the opening.

According to a further embodiment, the fire protection element can be mounted on the combustible body by means of a closure element, a wire, a metal cable tie or an adhesive, and slid together with said body into the opening in the ceiling or wall. As a result, simple and space-saving installation of the fire protection element is possible.

Figure 2:
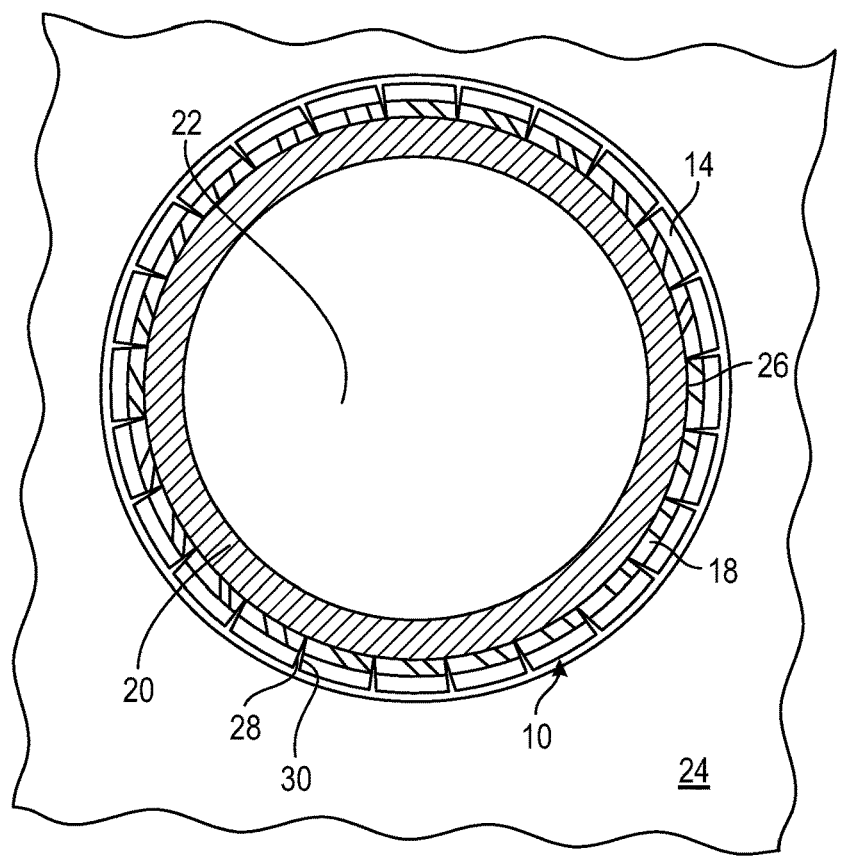
FIG. 2 shows a cross-sectional view of a fire protection element according to the invention, arranged around a pipeline, with the tongues located in a starting position.
Figure 3:
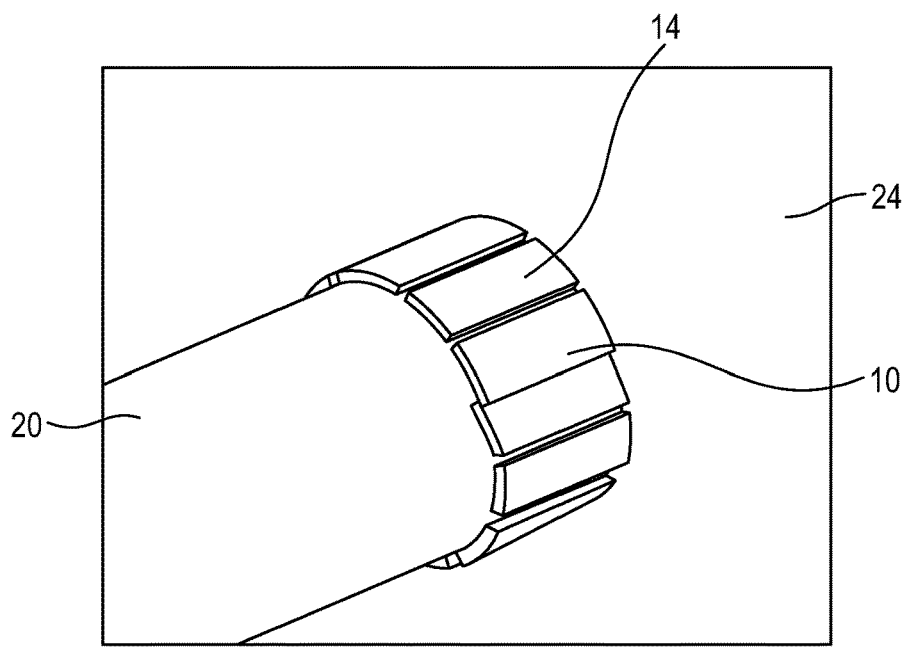
FIG. 3 shows a perspective view of a fire protection element according to the invention in the starting position, which element is placed around a pipeline which is routed through an opening in a wall.

Further advantages and properties of the invention can be found in the following description of preferred embodiments and in the drawings to which reference is made. However, these should not be understood in a restrictive sense. In the drawings:

FIG. 1 is a plan view of a fire protection element according to the invention;

FIG. 2 is a cross-sectional view of a fire protection element according to the invention, arranged around a pipeline, the tongues being located in a starting position; and FIG. 3 is a perspective view of a fire protection element according to the invention in the starting position, which element is placed around a pipeline which is routed through an opening in a wall.

FIG. 1 shows a fire protection element 10 having a belt-shaped carrier 12, from the edge of which tongues 14 protrude transversely to the longitudinal direction of said carrier, which tongues are connected to the wrap-type carrier 12.

In the shown embodiment, the belt-shaped carrier 12 and the tongues 14 are designed in one piece and are formed of a bimetal.

Alternatively, the belt-shaped carrier 12 and the tongues 14 can consist of different materials. In particular, merely the tongues 14 can be formed of a bimetal, and the carrier 12 can consist of a less expensive material, for example sheet steel.

The tongues 14 can also be adhesively bonded, welded, soldered or screwed to the belt-shaped carrier 12. In an alternative embodiment, the belt-shaped carrier 12 can also comprise recesses in which the tongues 14 engage and are fastened.

The individual tongues 14 can have the same width or different widths. The widths of the tongues are advantageously selected on the basis of the opening to be closed. Preferably, the tongues therefore have a width of ⅓ of the diameter of the opening to be closed, more preferably ⅙, even more preferably 1/12 or smaller. Particularly preferably, the tongues have a width of 25 mm.

FIG. 1 shows an embodiment in which the tongues 14 are separated from one another by slits 16. In a further embodiment (not shown here), the tongues 14 are arranged so as to not be spaced apart from one another.

The tongues 14 are preferably designed to be rectangular and arranged parallel to one another. Such an embodiment is relatively easy to produce by cutting a bimetallic strip at regular intervals using a suitable cutting tool. In principle, however, other shapes for the tongues are conceivable, for example a trapezoidal shape which tapers toward the free end of the tongues, in order to enclose the combustible body, preferably a pipeline or a cable conduit, in a desired manner.

In the embodiment shown in FIG. 1, a fire protection material 18 is applied to the tongues 14. The use of expandable graphite as a fire protection material 18 is particularly preferred since it ensures effective closure and is inexpensive to process.

Since the tongues 14 are formed of a bimetal, they can bend in one direction when the temperature changes. A bimetal comprises two layers of metals having different coefficients of thermal expansion. As a result, when the temperature changes the bimetal moves in the direction in which the metal that has a lower coefficient of expansion is mounted. Accordingly, the fire protection element 10 is mounted such that this side of the tongues 14 faces toward the combustible body or toward the center of the opening to be closed in the event of a fire.

Said side, which is shown in FIG. 1, can be provided with an additional color coating, in particular a colored acrylic dispersion which indicates the correct orientation during installation of the fire protection element 10.

An additional adhesive coating can also be provided at least on the tongues 14 before applying the fire protection material 18, which ensures better adhesion of the fire protection material 18 to the surface of the fire protection element 10.

FIG. 2 is a cross-sectional view of a combustible body in the form of a pipeline 20, which is introduced into an opening 22 and penetrates a wall 24 that is shown in a delineated manner. A fire protection element 10 is arranged around the pipeline 20 and within a gap 25 between the pipeline 20 and the wall 24. The fire protection element 10 comprises a plurality of tongues 14 and a coating 26 which faces toward the pipe, is applied to the tongues 14, and is made of the fire protection material 18. The tongues 14 protrude at least partially from the wall 24 and enclose the pipeline 20.

Instead of the pipeline 20, a cable or a cable conduit can be provided which is routed through the opening 22 in the wall 24.

The tongues 14 have a small thickness, for example at most 1 mm. The thickness of the coating 26 of the fire protection material 18 can be selected depending on the desired application and is preferably in a range of from 0.5 to 4.5 mm. However, the coating 26 is preferably at most five times, more preferably three times and even more preferably twice as thick as the tongues 14.

In the event of a fire, the pipeline 20 heats up until the material of the pipeline 20 fails. In particular for plastics pipes having a low melting point, for example pipes made of polyethylene or polypropylene, the material of the pipeline 20 already fails at temperatures above approximately 130° C. In this case, the tongues 14 are heated rapidly and move toward the center of the opening 22 exposed by the pipeline 20, even if the fire protection material 18 is not yet activated.

As a result, the opening 22 is already mechanically closed by the tongues 14 at least partially, such that a cap is formed on the opening 22.

Owing to the movement of the tongues 14, the fire protection material 18 is moved closer to the center of the opening 22 and is exposed to higher temperatures, such that the activation temperature of the fire protection material 18 is reached.

If, for example, expandable graphite is used as the fire protection material 18, said graphite expands very rapidly in the heat and thus, in addition to the tongues 14, closes the opening 22. In this way, very stable closure is ensured, which is provided by the expanded expandable graphite and is mechanically stabilized by the tongues 14.

The pipeline 20 can also be an empty conduit. These melt particularly rapidly in the event of a fire, meaning that the earliest possible closure of the opening 22 is required. This is made possible by the early activation of the tongues 14 at low temperatures.

In the embodiment shown in FIG. 2, the fire protection element 10 is laid around the pipeline 20 as a fire protection wrap. In order to achieve such an arrangement, a precut and coated wrap made of bimetal as shown in FIG. 1 can be guided around a pipeline 20 and slid into the opening 22 together with the pipeline 20.

For this purpose, a first side edge 28 of the fire protection element 10 is guided toward a second side edge 30 of the fire protection element 10. The two side edges 28 and 30 can either be arranged one next to the other, as shown in FIG. 2, or overlap.

The side edges 28 and 30 can be adhesively bonded to one another or closure elements (now shown here) are mounted on the side edges 28 and 30 of the fire protection element 10 and are connected to one another.

Alternatively, the fire protection element 10 is guided around the pipeline 20 and then fixed thereto by means of a wire and/or a metal cable tie.

The fire protection element 10 can be fastened to the pipeline 20 either when the pipeline 20 is already installed within the opening 22 or before the pipeline 20 is inserted into the opening 22.

It is also conceivable for the belt-shaped carrier 12 to be adhesively bonded to the pipeline 20 and the fire protection element 10 to be thereby fastened to the pipeline 20. This variant is suitable in particular if the fire protection element 10 is mounted on the pipeline 20 before the pipeline 20 is mounted in the opening 22.

Lastly, the fire protection element 10 can first be introduced into the opening 22 and fastened therein, for example, by adhesion, before the pipeline 20 is inserted into the opening 22.

In all of the embodiments, the fire protection element 10 is installed such that the tongues 14 protrude at least partially from the wall 24, such that they are exposed to rapid heating in the event of fire.

FIG. 3 shows a perspective view of a pipeline 20 having a fire protection element 10 mounted around the pipeline 20. In this embodiment, the tongues 14 at least partially overlap one another.

In FIG. 3, at least some of the tongues 14 also project out of the wall 24, while the belt-shaped carrier 12 is fitted completely within the wall 24. In this way, it can be ensured that the fire protection element 10 is securely mounted, while the tongues 14 can be heated rapidly in the event of fire and thus ensure early closure of the opening 22 exposed by the decomposing pipeline 20.

The fire protection element 10 can, as shown in FIG. 3, be installed hi a particularly space-saving manner, since no collar or fixation has to be mounted.

The invention claimed is:

1. A fire protection element for sealing a combustible body, which penetrates an opening in a wall or ceiling, in the event of a fire, wherein the fire protection element has a belt-shaped carrier from an edge of which tongues protrude transversely to a longitudinal direction of said belt-shaped carrier,
    wherein the tongues are connected to the belt-shaped carrier and are separated from one another by slits,
    wherein at least 50% of the tongues is formed of a bimetal which can move in one direction under the effect of heat, wherein the bimetal comprises two layers of metals having different coefficients of thermal expansion,
    wherein under the effect of heat the tongues by themselves move to close the opening, and
    wherein a fire protection material is applied to the tongues,
    wherein the fire protection material is applied only to a side of the tongues which has the layer of metal having a lower coefficient of thermal expansion and is an inside surface.

2. The fire protection element according to claim 1, wherein the fire protection material is applied to the tongues and to the belt-shaped carrier.

3. The fire protection element according to claim 1, wherein the belt-shaped carrier and the tongues are designed in one piece.

4. The fire protection element according to claim 1, wherein the tongues are separated from one another by slits, or
    wherein the tongues are arranged so as to not be spaced apart.

5. The fire protection element according to claim 1, wherein the tongues are designed in the form of rectangles.

6. The fire protection element according to claim 1, wherein the tongues move starting from a temperature of 60° C.

7. The fire protection element according to claim 6, wherein the tongues reach an end position at a temperature of at most 250° C.

8. The fire protection element according to claim 1, wherein the tongues, proceeding from a starting position thereof, can achieve a bend of more than 20°, but less than 135° when heated.

9. The fire protection element according to claim 1, wherein movement of the tongues is reversible.

10. The fire protection element according to claim 1, wherein the fire protection material is selected from the group consisting of an intumescent material, a fire protection coating, a fire protection foam, an ablative coating, and a combination thereof.

11. The fire protection element according to claim 10, wherein the intumescent material, if present, is expandable graphite;
    wherein the fire protection foam, if present, is a polyurethane-based foam; and
    wherein the ablative coating, if present, is aluminum trihydrate,
    wherein at least one of the intumescent material, fire-protection foam, and ablative coating are present.

12. The fire protection element according to claim 1, wherein different fire protection materials are applied to the tongues and to the belt-shaped carrier.

13. The fire protection element according to claim 1, wherein the belt-shaped carrier and/or the tongues are provided with an additional coating.

14. The fire protection element according to claim 13, wherein the additional coating is an adhesive coating and/or a color coating.

15. The fire protection element according to claim 1, wherein the fire protection element comprises an additional fire protection wrap which is arranged on the belt-shaped carrier and/or the tongues.

16. The fire protection element according to claim 1, comprising a plurality of tongues, and wherein all of the tongues are formed of the bimetal, and wherein the fire-protection element comprises expandable graphite, polyurethane-based foam, or aluminum trihydrate.

17. A method for sealing a combustible body, which penetrates an opening in a wall or ceiling, in the event of a fire, wherein the method comprises:
    introducing the fire protection element according to claim 1 into the opening, wherein the tongues of the fire protection element protrude at least partially from the opening and enclose the combustible body;
    wherein the tongues move toward the opening when heated.

18. The method according to claim 17, wherein at least the belt-shaped carrier of the fire protection element is slid, between the wall or ceiling and the combustible body, into the opening and is secured therein.

19. The method according to claim 17, wherein the fire protection element is fastened to the combustible body and is inserted into the opening together with said combustible body.

20. The method according to claim 17, wherein the combustible body is a pipeline.

* * * * *